(12) United States Patent
Spychalski-Merle

(10) Patent No.: US 10,443,634 B2
(45) Date of Patent: Oct. 15, 2019

(54) TOOL COUPLER FOR A CLAMPING SYSTEM, IN PARTICULAR FOR CLAMPING A WELDING SADDLE TO A PLASTIC PIPE, AND A CLAMPING SYSTEM AND A METHOD FOR CLAMPING

(71) Applicant: PF-Schweißtechnologie GmbH, Alsfeld (DE)

(72) Inventor: Achim Spychalski-Merle, Alsfeld (DE)

(73) Assignee: PF-Schweisstechnologie, Alsfeld (DE)

( * ) Notice: Subject to any disclaimer, the term of this patent is extended or adjusted under 35 U.S.C. 154(b) by 781 days.

(21) Appl. No.: 14/846,133

(22) Filed: Sep. 4, 2015

(65) Prior Publication Data
US 2016/0069365 A1 Mar. 10, 2016

(30) Foreign Application Priority Data
Sep. 8, 2014 (DE) .......................... 10 2014 013 342

(51) Int. Cl.
| | |
|---|---|
| F16B 2/08 | (2006.01) |
| F16L 13/02 | (2006.01) |
| F16L 41/02 | (2006.01) |
| B29C 65/00 | (2006.01) |
| B60P 7/08 | (2006.01) |
| B29K 101/00 | (2006.01) |
| B29L 23/00 | (2006.01) |

(52) U.S. Cl.
CPC .............. *F16B 2/08* (2013.01); *B29C 66/532* (2013.01); *B29C 66/8222* (2013.01); *B60P 7/083* (2013.01); *F16L 13/02* (2013.01); *F16L 41/02* (2013.01); *B29K 2101/00* (2013.01); *B29L 2023/22* (2013.01)

(58) Field of Classification Search
CPC .. F16B 2/08; F16L 41/02; F16L 13/02; B29C 66/8222; B29C 66/532; B29K 2101/00; B29L 2023/22; B60P 7/083
See application file for complete search history.

(56) References Cited

U.S. PATENT DOCUMENTS

| | | | | |
|---|---|---|---|---|
| 3,290,010 A | | 12/1966 | Holmes | |
| 3,826,473 A | * | 7/1974 | Huber | B60P 7/083 24/68 CD |
| 4,155,537 A | * | 5/1979 | Bronson | F16G 11/12 24/909 |
| 4,268,012 A | * | 5/1981 | Ruehle | B60P 7/083 24/909 |

(Continued)

FOREIGN PATENT DOCUMENTS

DE 202010000251 6/2010

*Primary Examiner* — Robert Sandy
*Assistant Examiner* — Louis A Mercado
(74) *Attorney, Agent, or Firm* — Hahn Loeser & Parks LLP; Bret A. Hrivnak

(57) ABSTRACT

A tool coupler for a clamping system, in particular for clamping a welding saddle to a plastic pipe, including a body having a drive end and an opposite output end, a first positive engagement feature being formed at the drive end and a second positive engagement feature being formed at the output end, the first positive engagement feature being adapted to engage a torque wrench to drive the body, and the second positive engagement feature being adapted to engage a slotted strap shaft of a tensioning ratchet of a clamping system to transfer torques by positive engagement.

14 Claims, 5 Drawing Sheets

(56) References Cited

U.S. PATENT DOCUMENTS

| | | | | |
|---|---|---|---|---|
| 4,510,652 A * | 4/1985 | van Iperen | ............ | B60P 7/083 24/198 |
| 4,900,203 A * | 2/1990 | Pope | ............ | B60P 7/083 100/212 |
| 5,156,506 A * | 10/1992 | Bailey | ............ | B60P 3/41 24/68 CD |
| 6,092,437 A * | 7/2000 | Sumner | ............ | B60P 7/083 74/543 |
| 6,102,637 A * | 8/2000 | Mocci | ............ | B60P 7/083 410/100 |
| 6,105,211 A * | 8/2000 | Berger | ............ | A44B 11/125 24/68 CD |
| 6,558,092 B1 * | 5/2003 | Woodruff | ............ | B60P 7/083 410/103 |
| 6,626,621 B1 * | 9/2003 | Hugg | ............ | B60P 7/083 410/100 |
| 6,799,751 B1 * | 10/2004 | Anderson | ............ | B60P 7/083 24/68 CD |
| 6,824,121 B2 * | 11/2004 | Boice | ............ | B60P 3/075 24/69 ST |
| 7,413,170 B2 * | 8/2008 | Ruan | ............ | B60P 7/083 24/69 CT |
| 7,416,167 B1 * | 8/2008 | Knox | ............ | B60P 7/083 24/69 ST |
| 7,628,383 B2 * | 12/2009 | Cumbers | ............ | B60P 7/083 254/241 |
| 8,308,410 B2 * | 11/2012 | Foryan | ............ | B60P 7/0853 410/103 |
| 9,469,239 B2 * | 10/2016 | Armour | ............ | B60P 7/083 |
| 9,751,449 B2 * | 9/2017 | Bermes | ............ | B25B 25/00 |
| 2003/0177581 A1 * | 9/2003 | Huang | ............ | B25B 25/00 5/625 |
| 2006/0042052 A1 * | 3/2006 | Lu | ............ | B60P 7/083 24/68 CD |
| 2010/0199473 A1 * | 8/2010 | Long | ............ | B25B 13/02 24/68 CD |
| 2011/0150595 A1 | 6/2011 | Foryan | | |
| 2016/0193982 A1 * | 7/2016 | Wu | ............ | B60P 7/083 242/395 |

* cited by examiner

TOOL COUPLER FOR A CLAMPING SYSTEM, IN PARTICULAR FOR CLAMPING A WELDING SADDLE TO A PLASTIC PIPE, AND A CLAMPING SYSTEM AND A METHOD FOR CLAMPING

CROSS-REFERENCE TO RELATED APPLICATION(S)

This application claims the benefit of, and priority to, German Patent Application No. 10 2014 013 342.7, filed Sep. 8, 2014 with the German Patent Office, the disclosure of which is hereby incorporated by reference.

BACKGROUND

The invention relates to a tool coupler for a clamping system, in particular for clamping a welding saddle to a plastic pipe. The invention further relates to a clamping system, in particular for clamping a welding saddle to a plastic pipe having such a tool coupler, and to a tensioning ratchet for a clamping system, in particular for clamping a welding saddle to a plastic pipe, and to a method for clamping a welding saddle to a plastic pipe.

In order to provide additional branches, outlets or inlets in plastic pipelines that may already be laid, for example pipelines for carrying water, gas, oil, or the like, it is common practice to affix welding saddles by plastic welding to a peripheral surface of the plastic pipe. These welding saddles generally have a pipe connector in which, for example, a valve or the like is provided, and a curved flange collar which matches the outer curvature of the plastic pipe so that surface engagement can be produced between the flange collar and the plastic pipe. After the contact location on the plastic pipe has been cleaned, for example by peeling, the welding saddle is placed and fixed onto that location. To do that, the welding saddle has to be pressed with a specific pressing force against the outer pipe casing. An established technique in the prior art is to use tensioning ratchets and ratchet tie-down straps, such as those which are frequently used in the field of logistics as well, and which can be obtained, for example, from SpanSet Ltd., Cheshire, Great Britain. The ratchet lashing straps are generally arranged axially spaced apart from each other around the circumference of the plastic pipe and adjacent to the pipe connector of the welding saddle in such a way that the straps lie on an outwardly oriented surface of the flange collar of the welding saddle and thus press the welding saddle against the pipe. Compared to tensioning chains, the advantage of such ratchet lashing straps, which generally have textile straps, is that they do not damage the pipe. The straps are then tensioned manually by means of ratchet levers provided on the tensioning ratchet by the manufacturer. It has proved practicable in this regard to additionally use a tension force indicator (TFI), which can likewise be obtained from Span-Set Ltd. This element is disposed on the tensioning ratchet, at the point of connection between the strap and a frame of the tensioning ratchet, in such a way that a load is applied to it when the strap is tensioned. A scale then indicates the respective tensile force acting on the strap. The tensile force acting on the strap is an indicator for the contact pressure of the welding saddle against the pipe.

However, the disadvantage here is that the force indicator of the TFI does not always work reliably, due to the curvature of the pipe. When tightening the strap by means of the manually operated tensioning ratchet, the TFI may also slip and be difficult or even impossible to read. Another problem, particularly in the case of large plastic pipes, is that very strong clamping forces of 10 kN or more are needed, and that these are difficult to achieve with the clamping levers provided by the manufacturer on manually operated tensioning ratchets. At present, there are no TFIs available on the market that can indicate clamping forces of 10 kN or more.

SUMMARY OF THE INVENTION

One object of the present invention is therefore to overcome the aforementioned problems at least partially.

In a first aspect, the invention achieves the object by means of a tool coupler for a clamping system for clamping a welding saddle to a plastic pipe, comprising a body having a drive end and an opposite output end, a first positive engagement means being formed at the drive end and a second positive engagement means being formed at the output end, the first positive engagement means being adapted to engage a torque wrench to drive the body, and the second positive engagement means being adapted to engage a slotted strap shaft of a tensioning ratchet of a clamping system to transfer torques by positive engagement. The first positive engagement means is preferably adapted to reversibly engage a torque wrench to drive the body. The tool coupler can preferably be used with conventional tensioning ratchets having a slotted strap shaft for winding on a ratchet lashing strap. The tool coupler can preferably be disposed, in particular pushed onto, and preferably reversibly attached to a shaft end of the strap shaft, thus allowing a torque wrench, such as a torque ratchet, to be coupled for torque transmission to the strap shaft of the tensioning ratchet and thus to drive said shaft. Strap shafts of tensioning ratchets are generically slotted and have at least one slot extending axially through the entire shaft, said slot being used to receive a strap. One end of the strap is generally connected securely to a housing or frame of a tensioning ratchet, the other end of the strap being free. When setting up the clamping system, the free end of the ratchet lashing strap is placed, for example, around the pipe and the welding saddle, and pushed through the slot or gap in the strap shaft. In this way, the loop length of the ratchet lashing strap can be reduced to a matching size in a simple manner. By turning the strap shaft, the loop is further reduced in size, and a section of the strap is wound onto the strap shaft, as a result of which the strap is simultaneously fixed to the strap shaft, thus preventing the strap from slipping back. It is preferred that this slot in the strap shaft, which is provided by the manufacturer of generic tensioning ratchets such as those which can be used in the invention, be used to couple with the second positive engagement means of the tool coupler.

The invention allows a predetermined contact pressure, corresponding to a predetermined torque for tightening the strap shaft, to be applied to the welding saddle by means of a torque wrench. For that purpose, it is only necessary to set the required torque on the torque wrench and to operate the latter manually, for example, until the desired torque has been reached, which is indicated by tactile feedback in the case of normal torque wrenches. The tensioning operation per se is also simplified. When separate torque wrenches are used, greater leverage may be provided than is possible with the short clamping levers provided on tensioning ratchets by the manufacturer, which reduce the amount of force that can be manually applied by an operator. Furthermore, it is not necessary to provide a separate TFI for every conceivable clamping force; it is possible, instead, to cover a large range of torques, and thus a large range of clamping forces to be applied, by means of one torque wrench. This also allows savings of storage and material costs. Further savings of material and storage costs result from the fact that, in the tensioning ratchets which can be used in accordance with the invention, there is no need for clamping levers fixedly connected thereto to be provided by the manufacturer. This reduces not only the weight of a tensioning ratchet which can be used in accordance with the invention, but also its dimensions, with the result that storage costs can also be reduced.

It should be understood that the invention is not limited to clamping welding saddles to plastic pipes, but can likewise be used in the logistics industry in general, for example to clamp freight to a loading bed of a semi-trailer, or unit loads to pallets and the like. Even though the following description of the invention and the preferred embodiments is focused on the preferred application field of clamping welding saddles to plastic pipes, the claims are not limited to that field of application.

According to a first preferred embodiment, the first positive engagement means has a first central axis and the second positive engagement means has a second central axis, the central axes being coaxially aligned. This makes it particularly easy to drive the slotted strap shaft by means of the torque wrench. The central axes are preferably aligned coaxially with a rotational axis of the strap shaft in the assembled state.

It is further preferred that the first positive engagement means has an external hex. The first positive engagement means has, additionally or alternatively, an internal hex. Both external and internal hexes are widespread means of positive engagement that match a large number of tools which can be used with conventional torque wrenches. This allows a conventional torque wrench to be used with conventional tools in order to drive a strap shaft of a tensioning ratchet by means of the tool coupler according to the invention. The first positive engagement means preferably has both an external hex and an internal hex, as a result of which the flexibility of the tool coupler is further increased. In order to transfer such strong clamping forces, internal and external hexes are preferably dimensioned sufficiently, for example an external hex is provided with a socket size in a range between 15 and 26 mm, preferably with a socket size of 19 mm. The first positive engagement means is also shaped, additionally or alternatively, to match the tool receiver of a torque wrench. For that purpose, the first positive engagement means is preferably formed as a square end with a width ranging from 1 inch to 1.5 inches (2.54 cm to 3.81 cm). The tool coupler thus engages directly with the torque wrench, without separate tools therebetween.

According to another preferred embodiment, the second positive engagement means has a web for engaging the slot of a slotted strap shaft of a tensioning ratchet of a clamping system. This is a particularly simple way of producing a positive engagement coupling between the tool coupler and the slotted strap shaft, in order to transfer torques from the drive end of the tool coupler via the output end of the tool coupler to the strap shaft and thus to tighten the strap. The web is provided, for example, as a projection on the output end of the body of the tool coupler.

It is further preferred that the the web has a central plane defining the web, and that a central axis of the second positive engagement means lies substantially in the central plane. This further simplifies the transmission of torques from a torque wrench via the drive end and the output end of the tool coupler to a strap shaft of a tensioning ratchet of a clamping system. The central axis of the second positive engagement means preferably lies within the web or the central plane defining the web. The web preferably has a substantially planar, plate-shaped configuration, and the central plane lies within the web.

In one preferred configuration of the tool coupler, the second positive engagement means has two recesses for receiving two axial end portions of a slotted strap shaft of a tensioning ratchet of a clamping system. The recesses are preferably embodied in such a way that the tool coupler can be arranged with slight clearance on the end portion of the strap shaft, or can be pushed onto the end portion. It is further preferred that the web separates the two recesses from each other. This provides the tool coupler with a particularly beneficial design. When the web engages the slot of the strap shaft, the two end portions are located inside the recesses in such a way that a plug connection is produced by the two recesses being accommodated in the axial end portions, as a result of which the tool coupler can be self-retainingly and reversibly disposed on the strap shaft.

According to another preferred embodiment the tool coupler has a bore extending through the body at least partially radially, preferably in the region of the second positive engagement means, to receive a locking pin for locking the tool coupler to a strap shaft of a tensioning ratchet of a clamping system. By nature, conventional tensioning ratchets generally have a locking pin already, which is guided through a through hole in the strap shaft to prevent the strap shaft from falling axially out of a frame or housing of the tensioning ratchet. For that reason, the tool coupler is preferably also provided with such a bore, in particular a through hole, so that the locking pin can be guided through the through hole of the tool coupler and likewise through the bore of the strap shaft in order to lock them together. This prevents the tool coupler from detaching itself from the slotted strap shaft when the latter is driven by means of the torque wrench, thus simplifying how a clamping system is handled.

It is also preferred that the tool coupler is of integral construction. The tool coupler is preferably molded as one piece from a metal material. For example, the tool coupler is manufactured by machining it from a solid material, or is produced as a semi-finished product using a molding process and subsequently machined to produce the finished part. As a result, the tool coupler is robust on the whole and can also be manufactured cost-efficiently.

In a second aspect, the object referred to at the outset is achieved by a clamping system for clamping a welding saddle to a plastic pipe, the clamping system having a tool coupler according to one of the preferred embodiments of a tool coupler described in the foregoing, and a tensioning ratchet, wherein the tensioning ratchet has a frame, a slotted strap shaft rotatably mounted in the frame and having an axial slot and a strap, said strap being connectable or connected by a first end to the frame and the other end being insertable through the slot of the strap shaft, such that the strap can be wound onto the strap shaft by rotation thereof, to reduce the size of a loop in the strap, the tensioning ratchet having a latching mechanism that allows rotation of the strap shaft in the one direction and prevents rotation in the other direction, wherein at least one slotted end of the strap shaft extends out of the frame and the tool coupler can be releasably arranged on the slotted shaft end by means of the second positive engagement means. For the preferred embodiments of the tool coupler and their respective advantages, reference is made to the entire description above regarding of the first aspect of the invention. The advantages of the tool coupler as described above are obtained, and the effects of the invention can be utilized advantageously when it is combined with a tensioning ratchet which is embodied like the tensioning ratchet according to the second aspect of the invention.

In one preferred embodiment of the clamping system, the tool coupler has a bore extending at least partially radially through the body, preferably in the region of the second positive engagement means, to receive a locking pin for locking the tool coupler to a strap shaft of a tensioning ratchet of a clamping system, and the tensioning ratchet of the clamping system has a locking pin extending radially through the bore of the tool coupler and a bore in the slotted shaft end of the strap shaft such that the tool coupler is locked onto the strap shaft by means of the locking pin. This produces a reversibly releasable coupling between the tool coupler and the strap shaft, such that the tool coupler can be removed after completing a clamping operation and can then be used to tighten other straps.

A particularly preferred embodiment of the clamping system is one in which the clamping system also comprises a torque wrench, wherein the first positive engagement means of the tool coupler engages the torque wrench. For that purpose, the torque wrench may have a tool, for example, and the first positive engagement means of the tool coupler engages the tool. Alternatively, the first positive engagement means of the tool coupler is designed to mate with a tool receiver on the torque wrench, so that the torque wrench can engage the tool coupler directly. The advantages already described above with regard to the tool coupler are particularly apparent in a system comprising the tool coupler, the tensioning ratchet and the torque wrench.

In another, third aspect of the invention, the object referred to at the outset is achieved by a tensioning ratchet for a clamping system for clamping a welding saddle to a plastic pipe, wherein the tensioning ratchet has a frame having a slotted strap shaft rotatably mounted in the frame, and a strap which is reversibly connected by a first end to the frame and the other end being insertable through the slot in the strap shaft, such that the strap can be wound onto the strap shaft by rotation thereof to reduce the size of a loop in the strap, the tensioning ratchet having a latching mechanism that allows rotation of the strap shaft in the one direction and prevents rotation in the other direction, wherein at least one slotted end of the strap shaft extends out of the frame, and a first positive engagement means adapted to engage a torque wrench to drive the strap shaft is integrally molded onto the shaft end. According to this aspect of the invention, a separate tool coupler acting between a torque wrench and a tensioning ratchet is not provided. Instead, the first positive engagement means is provided integrally at one axial end of the strap shaft. In this way, the torque wrench can directly engage the strap shaft of the tensioning ratchet in order to drive it. The first positive engagement means is preferably embodied like the first positive engagement means of the tool coupler as described above, thus preferably having an external hex, an internal hex and/or an external square spindle with a shape matching the tool receiver of a torque wrench. A tensioning ratchet equipped in this manner in accordance with the invention can be driven with a torque wrench, and can be operated with an integrated clamping lever that is preferably provided, as is common practice in prior art tensioning ratchets. This enlarges a deployment space for the tensioning ratchet according to the invention, and the latter can be operated not only manually by means of the clamping lever, but also, if so desired, by a torque wrench for setting a particular clamping force of the tensioning strap.

The object specified at the outset is also achieved, in a fourth aspect of the invention, by a method for clamping a welding saddle to a plastic pipe, in particular using a clamping system according to one of the preferred embodiments of a clamping system as described above for clamping a welding saddle to a plastic pipe, comprising a tool coupler and a tensioning ratchet, or using one of the preferred tensioning ratchets described above, said method comprising the step of tightening a strap by means of a tensioning ratchet and a torque wrench, wherein the torque wrench acts upon a slotted strap shaft of the tensioning ratchet. It should be understood that the method and the preferred embodiments of a tool coupler, a clamping system and a tensioning ratchet as described above have identical and similar aspects, as specified, in particular, in the dependent claims relating to the tool coupler and the clamping system. Reference is therefore made to the entire description above for the preferred embodiments and design features and for the advantages of individual features.

According to a first preferred embodiment of the method, the method further comprises the steps of: arranging a strap of the clamping system around a plastic pipe and a welding saddle disposed thereon; setting a predetermined lashing force on the torque wrench, corresponding to a predetermined desired clamping force of the strap. A second strap of a second clamping system is preferably arranged around the plastic pipe and around the welding saddle disposed thereon, and is likewise tightened.

BRIEF DESCRIPTION OF THE DRAWINGS

The invention shall now be described in more detail with reference to one embodiment and with reference to the attached drawings, in which.

DETAILED DESCRIPTION

Figure 1:
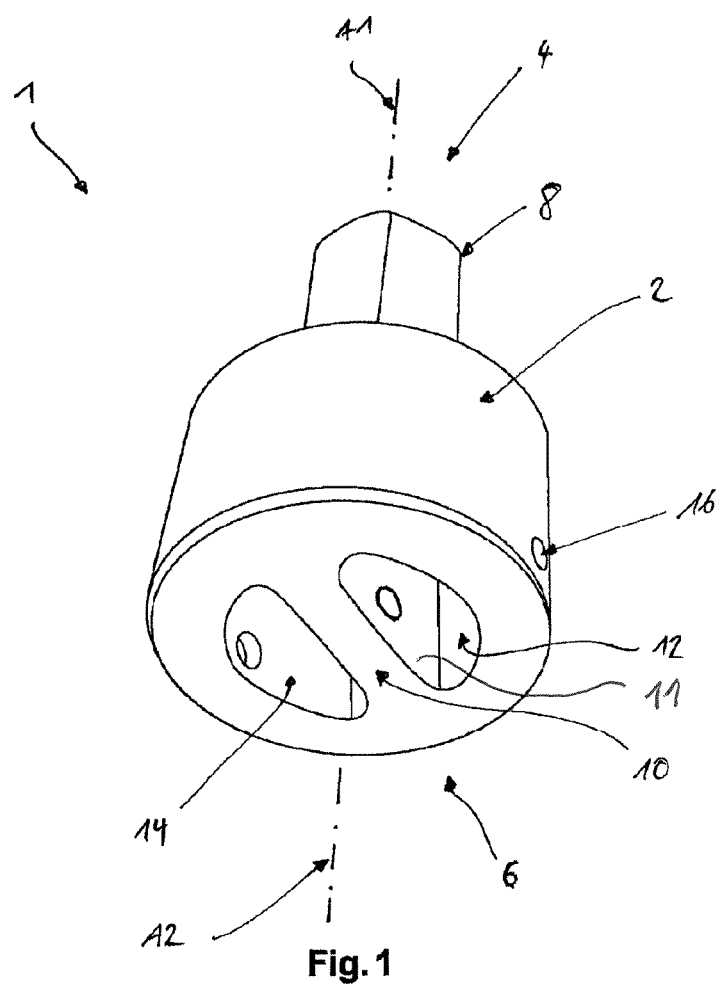
FIG. 1 shows a perspective view of a tool coupler.
Figure 2:
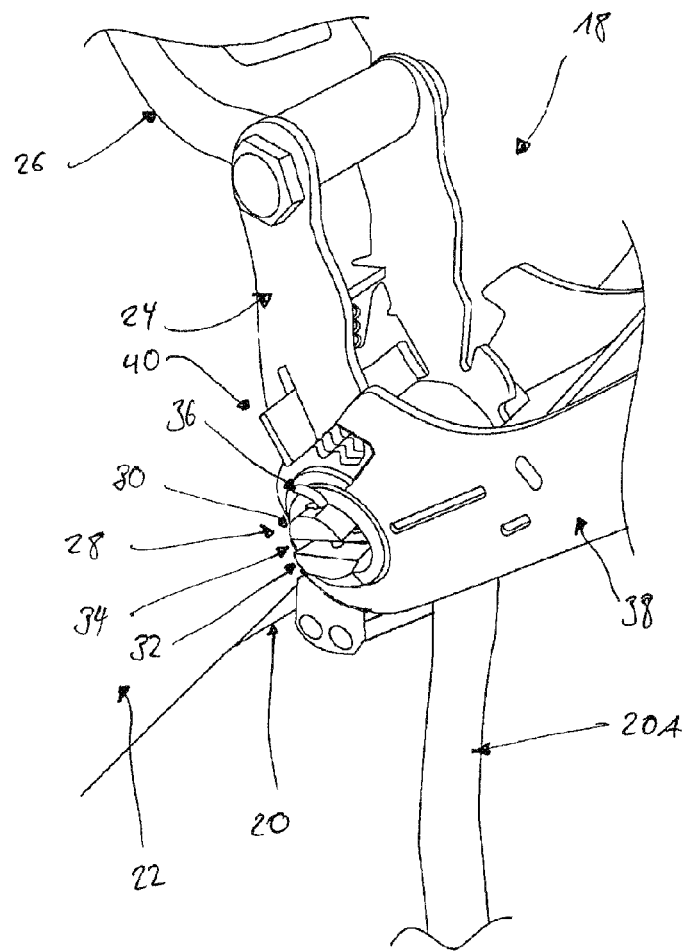
FIG. 2 shows a perspective view of a tensioning ratchet having a ratchet lashing strap disposed around a plastic pipe.
Figure 3:
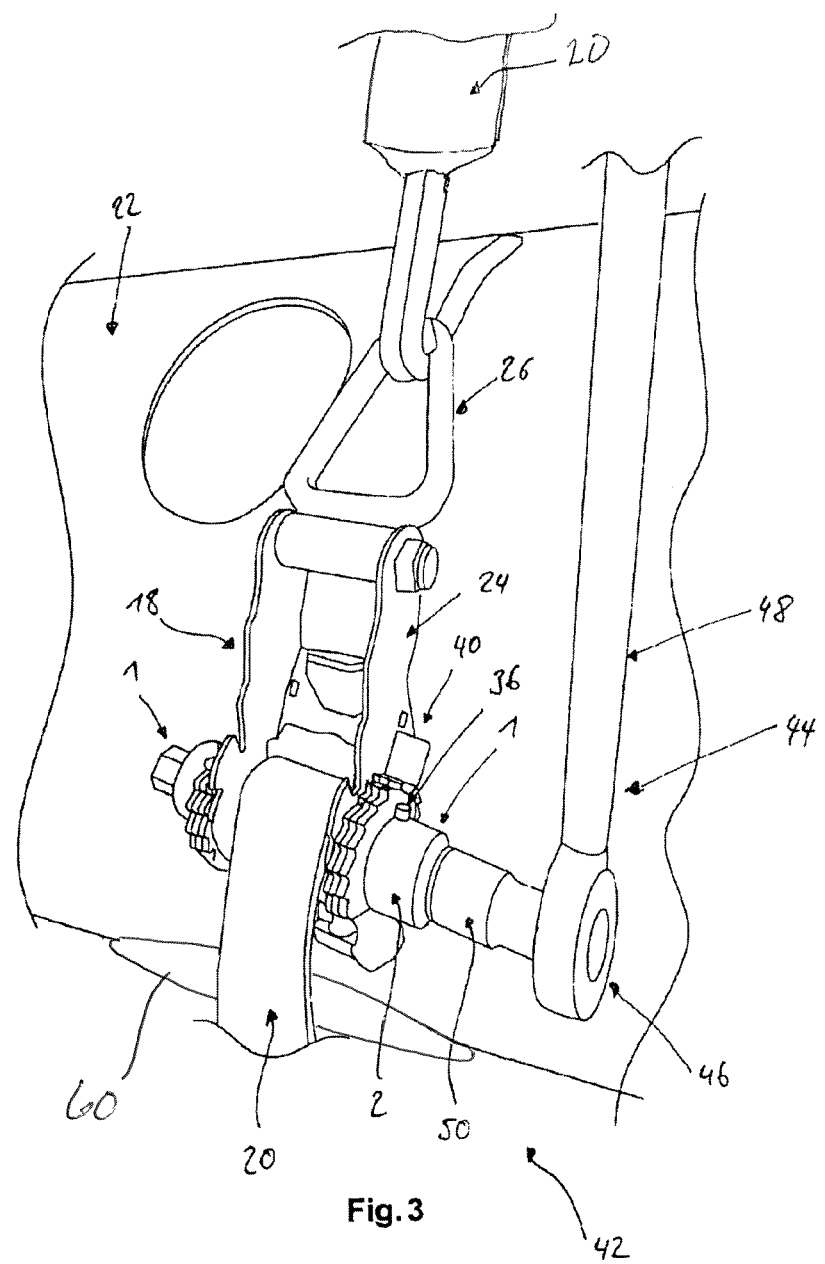
FIG. 3 shows a clamping system comprising a tensioning ratchet, a ratchet lashing strap, a tool coupler and a torque wrench, the tensioning ratchet and the ratchet lashing strap being disposed around a plastic pipe.
Figure 4:
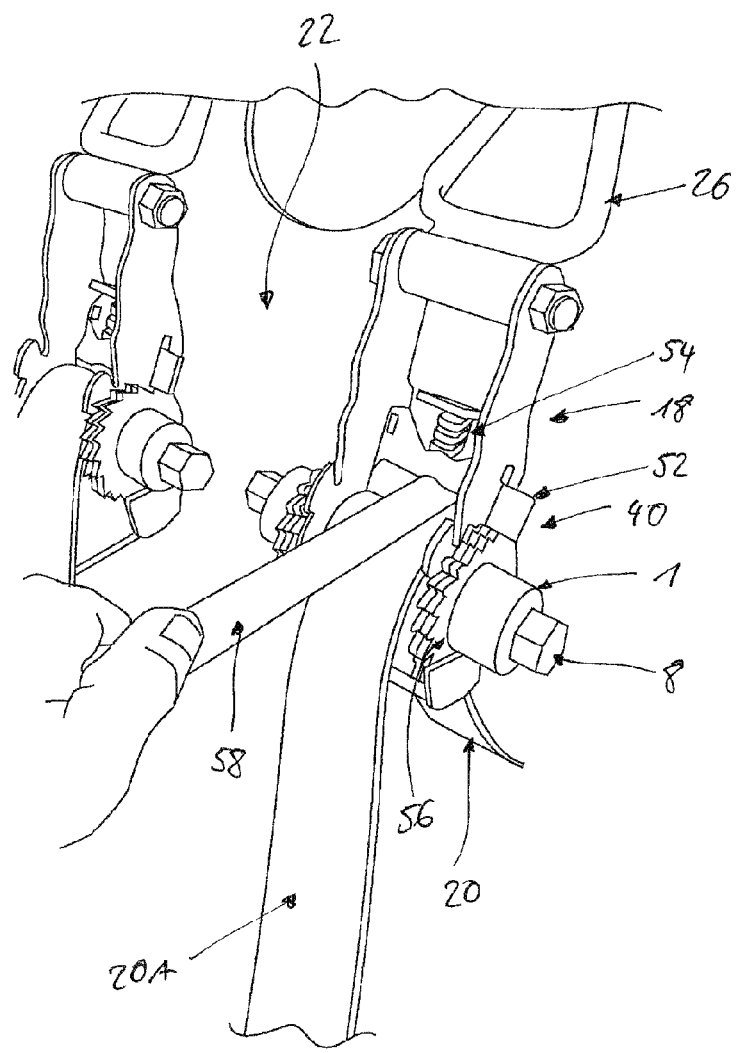
FIG. 4 shows a tensioning ratchet and ratchet lashing strap arranged around a plastic pipe, the snap-in latching mechanism being manually released.

FIG. 1 shows, in a schematic, perspective view, a tool coupler 1 for a clamping system 42 (see FIG. 2) for clamping a welding saddle to a plastic pipe 22 (see FIGS. 2-4). Tool coupler 1 has a body 2, which in this embodiment has a substantially cylindrical shape. The body has a drive end 4 and an opposite output end 6. A first positive engagement means is formed at drive end 4, and a second positive engagement means 10 is formed at output end 6. The first positive engagement means is adapted to engage a torque wrench (see FIG. 3) to drive body 2, and the second positive engagement means 10 is adapted to engage a slotted strap shaft (see FIGS. 2-4) of a tensioning ratchet of a clamping system for transferring torques by positive engagement.

Figure 5:
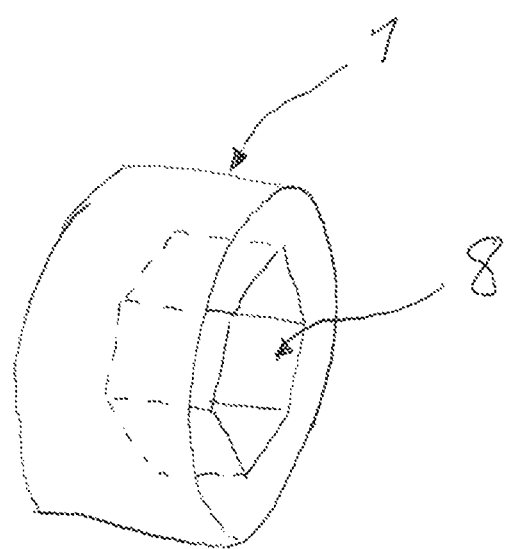
FIG. 5 shows a tool coupler having an internal hex.

According to this embodiment, the first positive engagement means 8 is embodied as an external hex. More precisely, this first positive engagement means 8 according to this embodiment is embodied as a 19 mm external hex, that is, with a socket size of 19 mm. As contemplated previously herein, as an alternative to an external hex, an internal hex may be provided (see FIG. 5, for example). In one alternative, not shown, the first positive engagement means 8 has an outer contour which matches the tool receiver of a torque wrench in such a way that the torque wrench can directly engage the first positive engagement means 8 to drive body 2.

In this embodiment, the second positive engagement means 10 at output end 6 is embodied as a web 11. Web 11 separates two recesses 12, 14 from one another. Recesses 12, 14 are used to receive axial shaft ends of a slotted strap shaft (cf. FIG. 2). Due to web 11 separating from one another the two recesses 12, 14 provided in body 2, it is not embodied as a projection. Instead, the end face of output end 6 is substantially flat in shape. This is advantageous, as it means there are fewer projecting elements on tool coupler 1, with the result that handling can be simplified.

The first positive engagement means 8 and the second positive engagement means 10 each have a central axis A1 and A2, respectively. According to this embodiment, the two central axes A1, A2 are congruent with each other and form a common central axis of tool coupler 1.

According to this embodiment (FIG. 1), tool coupler 1 has a bore 16 extending all the way through body 2. Bore 16 is perpendicular to central axes A1, A2 and passes through body 2 in the region of the second positive engagement means 10, that is to say, it passes through web 11 and through walls defining the radially outer boundaries of recesses 12, 14. Bore 16 is used to receive a locking pin (cf. FIG. 3). Tool coupler 1 according to this embodiment is made as one piece from a metal material.

Whereas the main structural features of tool coupler 1 have been described with reference to FIG. 1, use of the tool coupler 1 shall now be described in more detail with reference to FIGS. 2-4.

FIG. 2 shows a tensioning ratchet 18 with a strap 20. Both tensioning ratchet 18 and strap 20 are embodied as in the prior art, and suitable tensioning ratchets are obtainable, for example, from SpanSet Ltd. As shown in FIG. 2, tensioning ratchet 18 and strap 20 are arranged around a plastic pipe 22, in order to press a welding saddle (not shown) against plastic pipe 22. Tensioning ratchet 18 has a frame 24, at a first end of which a holder 26 securely connected to strap 20 is provided (not shown in FIG. 2, but see FIG. 3). Tensioning ratchet 18 also has a strap shaft 28, which runs through frame 24 and projects out of it at axial ends. The strap shaft is slotted and has two axial shaft ends 30, 32 which enclose axial slot 34 between them. A locking pin 36 which passes radially through the two shaft ends 30, 32 is also provided, thus preventing strap shaft 28 from leaving frame 24.

Tensioning ratchet 18 also has a clamping lever 38 provided by the manufacturer, which engages strap shaft 28 to rotatingly drive the latter, as well as a latching mechanism 40. Latching mechanism 40 is used to allow rotation in the one direction of the strap shaft (in FIG. 2, the counter-clockwise direction; lever 38 is moved upwards) and to prevent rotation in the other direction (in FIG. 2, in the clockwise direction). This allows a tensioned position of strap 20 to be fixed. Strap 20 is rolled onto the slotted strap shaft 28 when it is tightened, and a free strap end 20a hangs down from tensioning ratchet 18 thereby.

As can be seen from a comparison with FIGS. 1 and 2, in particular, the web 11 is embodied in such a way that it can engage slot 34 between the two shaft ends 30, 32. Recesses 12, 14 are shaped accordingly, in order to accommodate the matching shaft ends 30, 32. In this way, tool coupler 1 is pushed onto the slotted strap shaft 28. In this embodiment (see FIGS. 1 and 2), locking pin 36 must preferably be removed beforehand from the slotted strap shaft 28, after which tool coupler 1 must be pushed onto the shaft so that, for example, shaft end 30 engages recess 12, and shaft end 32 engages recess 14, with web 11 engaging slot 34, after which locking pin 36 is guided through bore 16 and the corresponding bore in strap shaft 28, such that tool coupler 1 is fixed by positive engagement to strap shaft 28 and cannot detach itself from tensioning ratchet 18. An arrangement as shown in FIG. 3 is thus obtained.

FIG. 3 shows clamping system 42 for clamping a welding saddle 60 to a plastic pipe 22, comprising a tool coupler 1 and a tensioning ratchet 18. According to this embodiment, a torque wrench 44 is also provided. As shown in FIG. 3, and as shall now be described, torque wrench 44 is engaged with tool coupler 1. Tensioning ratchet 18 is shown in FIG. 3 without the clamping lever 38 provided by the manufacturer. When strap shaft 28 is driven by a torque wrench, with the aid of the tool coupler, there is no need for a clamping lever 38 such as the one normally provided with conventional tensioning ratchets 18.

According to this embodiment, and as can be seen from FIG. 3, two tool couplers 1 are arranged reversibly releasably on the two axial ends of slotted strap shaft 28 (this cannot be seen in FIG. 3, as they are on the inside). It can also be seen in the case of tool coupler 1 on the right in FIG. 3 that it is connected by positive engagement to strap shaft 28 by means of locking pin 36.

Torque wrench 44 has a wrench head 46 and a shaft 48. In this embodiment, a tool 50 which engages with the first positive engagement means 8 of tool coupler 1 is also attached releasably to wrench head 46. This allows slotted strap shaft 28 to be driven by the torque wrench in order to tighten strap 20.

In one alternative, not shown, the first positive engagement means 8 is molded directly onto shaft ends 30, 32, so that torque wrench 44 can act directly on strap shaft 28.

To tighten strap 20, the following steps must be taken. In the first step, tool coupler 1 must be pushed onto shaft ends 30, 32 of the slotted strap shaft 28 and may have to be fixed in place with locking pin 36. The next step is to determine the torque necessary to achieve the desired contact pressure for pressing the welding saddle 60 onto pipe 22. This desired torque is set on torque wrench 44 by means of the adjuster provided thereon. A tool 50 matching the positive engagement means 8 of tool coupler 1 is then attached to torque wrench 44, or attached to wrench head 46, and said tool 50 is then made to engage tool coupler 1. Torque wrench 44 is then operated manually, thus tightening strap 20 until the torque set on torque wrench 44 has been reached. By tactile and/or auditory and/or visual feedback from torque wrench 44 on reaching the set torque, the operator learns that the respective torque has been reached. The tightening procedure has then been completed, and the torque wrench 44 can be removed. It is also possible at that point to remove tool coupler 1 from tensioning ratchet 18 and to use it, for example, to operate another tensioning ratchet with as respective strap.

When welding has been completed, the tensioning ratchet can then be released. This is shown schematically in FIG. 4. The tensioning ratchet 18 in that Figure is the same one as in FIG. 3. Tool coupler 1 is still located on slotted strap shaft 28. Torque wrench 44, with tool 50, has been removed. Latching mechanism 40 has a ratchet pawl 52, which is biased into a locking position by means of a spring 54. In this locking position, ratchet pawl 52 engages a toothed wheel 56 of latching mechanism 40 and thus prevents any rotation in the opposite direction to the tightening direction of strap shaft 28. In commercially available tensioning ratchets 18, latching mechanism 40 is activated by operating clamping lever 38 accordingly (see FIG. 2). However, given that clamping lever 38 has been removed in this embodiment (see FIGS. 3 and 4, in particular), since tightening is done by means of torque wrench 44, latching mechanism 40 is released manually in this case. An operator pushes a rod 58 into a space in tensioning ratchet 18 and applies pressure on ratchet pawl 52 in the opposite direction to the spring force applied by spring 54, thus releasing the pawl from toothed wheel 56, such that the latter, along with strap shaft 28, can rotate in the opposite direction to the tightening direction of strap shaft 28, so that the force acting on strap 20 is removed. When strap 20 has been completely unreeled from strap shaft 28, it can be pulled out of slot 34 in strap shaft 28, and the entire clamping system can then be removed from plastic pipe 22.

The invention claimed is:

1. A clamping system, in particular for clamping a welding saddle to a plastic pipe, comprising a tool coupler, and
a tensioning ratchet, wherein the tensioning ratchet has a frame, a slotted strap shaft rotatably mounted in the frame and having an axial slot, and a strap, said strap being connected by a first end to the frame and a second end being insertable through the axial slot of the slotted strap shaft, such that the strap is able to be wound onto the slotted strap shaft by rotation thereof to reduce a size of a loop in the strap, the tensioning ratchet having a latching mechanism which allows rotation of the slotted strap shaft in one direction and prevents rotation in another direction,
wherein at least one slotted end of the slotted strap shaft extends out of the frame and the tool coupler can be arranged reversibly releasably on the slotted end by a second positive engagement means, and,
wherein the second positive engagement means has a web for engaging the slotted end of the slotted strap shaft of the tensioning ratchet of the clamping system.

2. The clamping system according to claim 1, wherein the tool coupler comprises
a body having a drive end and an opposite output end, a first positive engagement means being formed at the drive end with the second positive engagement means being formed at the output end,
the first positive engagement means being adapted to engage a torque wrench to drive the body, and the second positive engagement means being adapted to engage the slotted strap shaft of the tensioning ratchet of the clamping system to transfer torques by positive engagement.

3. The clamping system according to claim 2, wherein the first positive engagement means has a first central axis and the second positive engagement means has a second central axis, the central axes being coaxially aligned.

4. The clamping system according to claim 2, wherein the first positive engagement means has an external hex.

5. The clamping system according to claim 2, wherein the first positive engagement means has an internal hex.

6. The clamping system according to claim 2, wherein the web has a central plane defining the web, and a central axis of the second positive engagement means lies substantially in the central plane.

7. The clamping system according to claim 2, wherein the second positive engagement means has two recesses for receiving two axial end portions of the slotted strap shaft of the tensioning ratchet of the clamping system.

8. The clamping system according to claim 2, wherein the second positive engagement means has two recesses for receiving two axial end portions of the slotted strap shaft of the tensioning ratchet of the clamping system, and wherein the two recesses are separated from each other by the web.

9. The clamping system according to claim 2, the tool coupler being embodied in one piece.

10. The clamping system according to claim 1, wherein the tool coupler has a bore extending through a body at least partially radially in respect of a central axis of the second positive engagement means, preferably in a region of the second positive engagement means, to receive a locking pin for locking the tool coupler to the slotted strap shaft of the tensioning ratchet of the clamping system, and where the tensioning ratchet has the locking pin extending radially through the bore in the tool coupler and a bore in the slotted end of the slotted strap shaft such that the tool coupler is locked onto the strap shaft by the locking pin.

11. The clamping system according to claim 1, further comprising a torque wrench, wherein a first positive engagement means of the tool coupler engages the torque wrench.

12. The clamping system according to claim 1,
wherein a first positive engagement means adapted to engage a torque wrench to drive the strap shaft is integrally molded onto the slotted end.

13. A method for clamping a welding saddle to a plastic pipe, in particular by using the clamping system according to claim 1, comprising the steps of:
tightening the strap using the tensioning ratchet and a torque wrench, wherein the torque wrench acts upon the slotted strap shaft of the tensioning ratchet.

14. The method according to claim 13, comprising the steps of:
arranging the strap of the clamping system around a plastic pipe and a welding saddle disposed thereon;
setting a predetermined lashing force on the torque wrench, corresponding to a predetermined desired clamping force of the strap.

* * * * *